United States Patent [19]
Shaberman

[11] Patent Number: 5,938,750
[45] Date of Patent: Aug. 17, 1999

[54] METHOD AND APPARATUS FOR A MEMORY CARD BUS DESIGN

[75] Inventor: Tony Shaberman, Roseville, Calif.

[73] Assignee: Intel Corporation, Santa Clara, Calif.

[21] Appl. No.: 08/672,827

[22] Filed: Jun. 28, 1996

[51] Int. Cl.$^6$ .................................................. G06F 13/00
[52] U.S. Cl. .......................... 710/102; 710/103; 710/129; 710/13; 710/72; 710/74; 711/115; 711/105; 711/106
[58] Field of Search ...................................... 395/500, 800, 395/882, 280, 281, 282, 309, 821, 828, 200.08, 200.01, 846, 283, 284, 833, 892, 894; 380/23, 24; 711/103, 115, 170, 105, 106

[56] References Cited

U.S. PATENT DOCUMENTS

| | | |
|---|---|---|
| 5,293,424 | 3/1994 | Holtey et al. . |
| 5,357,091 | 10/1994 | Ozawa et al. ............................ 235/380 |
| 5,650,967 | 7/1997 | Seibert ................................ 365/185.33 |
| 5,802,325 | 9/1998 | Le Roux ................................... 395/282 |

OTHER PUBLICATIONS

Personal Computer Memory Card International Association, PCMCIA PC Card Standards, Revision 2.01, Pages See Attached, Nov. 1992.
*Miniature Card Specification,* Release 1.0, Feb. 29, 1996, Intel Corporation (1995,96).
*PC Standard,* Release 2.0, Sep. 1991, Personal Computer Memory Card International Association.

Primary Examiner—Glenn A. Auve
Assistant Examiner—Rupal D. Dharia
Attorney, Agent, or Firm—Blakely, Sokoloff, Taylor & Zafman

[57] ABSTRACT

An apparatus and method for a memory card bus design. The memory card bus design allows the memory card to interface with a wide variety of systems such as, hand held consumer products and personal computers. The bus design provides a simple interface for both volatile and non-volatile memories which allows data to be exchanged between the memory device and another system.

23 Claims, 4 Drawing Sheets

METHOD AND APPARATUS FOR A MEMORY CARD BUS DESIGN

FIELD OF THE INVENTION

The present invention pertains to the field of memory cards. More particularly, this invention relates to the field of bus designs for memory cards.

BACKGROUND OF THE INVENTION

The proliferation of laptop and notebook sized personal computers has created an extensive market for peripheral devices that further expand the capability of a given laptop design. These peripheral devices add features that vary from the addition of fax/modem cards to the addition of memory expansion cards. Although these peripheral devices provide many benefits, the peripheral devices typically hang off the side of the portable computer system thereby making the system no longer portable.

To provide a convenient interface for small peripheral devices, a computer industry consortium drafted a specification defining an interface for peripherals. The computer industry consortium is known as the Personal Computer Memory Industry Association (PCMCIA) and the peripherals adhering to the PCMCIA specification are known as PCMCIA cards. The first version of the PCMCIA specification (PCMCIA 1.0) created an interface that handles memory card expansion as well as some simple peripherals such as card-sized modems. The second version of the PCMCIA specification (PCMCIA 2.0) is a bus specification capable of handling common types of computer peripherals such as hard disk drives and Local Area Network (LAN) interfaces. (See PC Card Standard, Release 2.0, September 1991, Personal Computer Memory Card International Association).

The PCMCIA specification is defined such that it is possible to plug in and remove peripheral cards from a host computer system. Focusing on compatibility between different computer systems, the PCMCIA specifications define the physical dimensions and power level of PCMCIA cards. The PCMCIA specification also defines voltage levels, connector pinouts, the range of card information (CIS) which is stored in the cards, and indicates how software can read configuration information.

Figure 1:
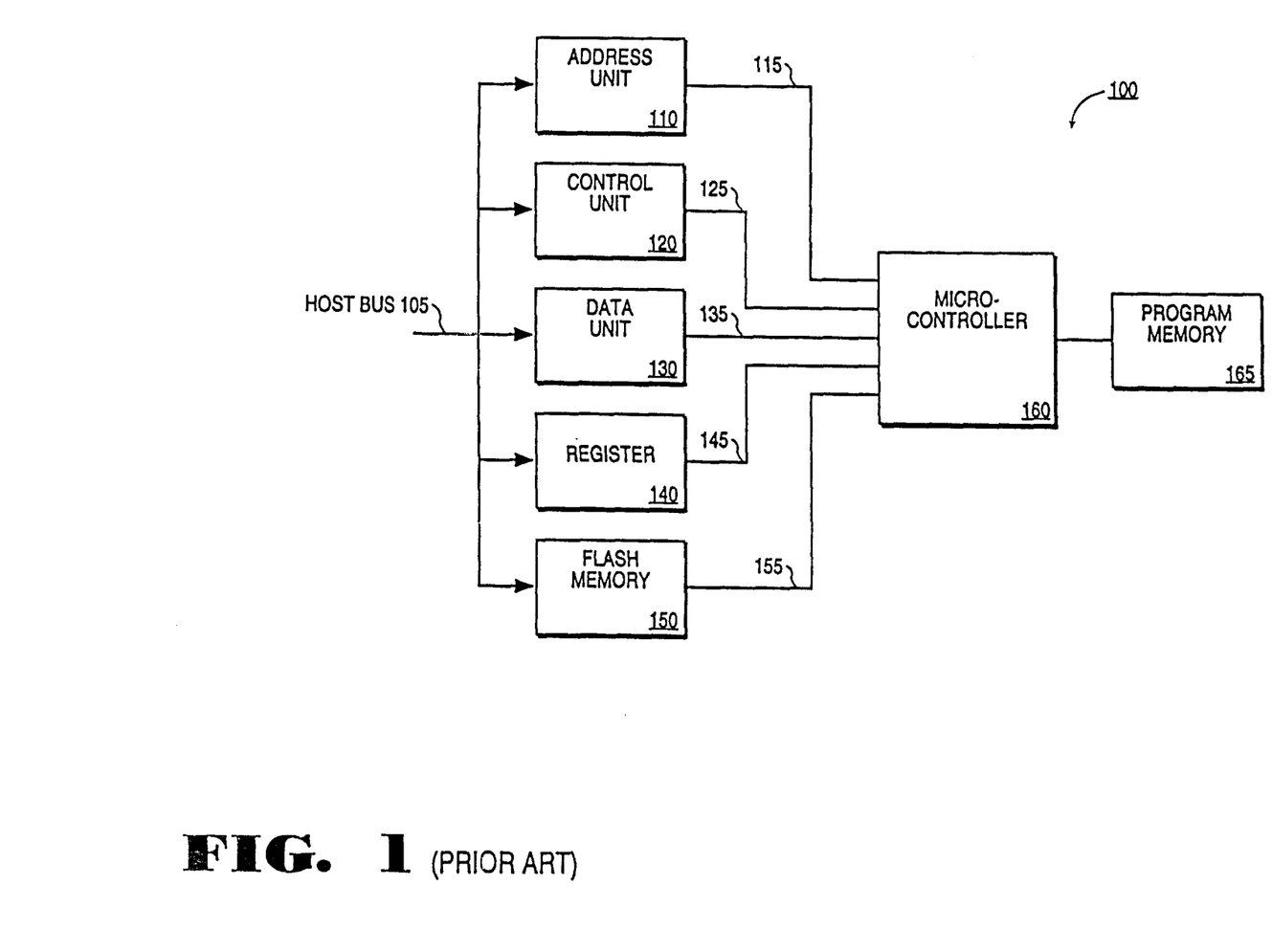
FIG. 1 illustrates a typical PCMCIA card.

FIG. 1 shows a PCMCIA card. As illustrated, the PCMCIA card 100 includes an address unit 110 for generating address signals to a microcontroller 160, a control unit 120 for generating control signals to the microcontroller 160, a data unit 130 for driving data to the microcontroller 160, a register unit 140 for storing control data for the microcontroller 160, the microcontroller 160 for controlling access requests by the host computer to the CIS information, and a separate program memory array device 165 to store the CIS information. The PCMCIA card 100 also includes a flash memory 150 which may be optional in other systems.

As illustrated in FIG. 1, the address unit 110 communicates directly with the microcontroller 160 via address lines 115 by submitting address requests received from a host computer (not shown) to the microcontroller 160 to access memory locations in the program memory 165 which contains the CIS. Utilizing the CIS, the host computer is able to determine what parameters are necessary for communication between the host system and the PCMCIA card. The microcontroller 160 also communicates with the control unit 120 via control lines 125 to control and monitor memory access requests from the host computer to the program memory device 165.

The data unit 130 supplies the data from the host computer to the microcontroller 160 via data lines 125, and data from the microcontroller 160 is transmitted through the data unit 130 to the host computer via host bus 105.

In FIG. 1, the microcontroller 160 executes instructions received from the host computer by execution of a sequence of corresponding instructions stored in program memory device 165, therefore, microcontroller 160 is continuously powered up to perform operations required to support the PCMCIA operations. Accordingly, the PCMCIA card 100 consumes a relatively large amount of power in the host computer because the microcontroller is continuously in a powered-up state.

The system described in FIG. 1 also has the additional drawback of relying on each PCMCIA card to supply its own configuration (CIS) information. This requires that PCMCIA peripheral devices utilize non-volatile memories in their design. Accordingly, volatile memory devices, such as DRAMS and some SRAMS which provide a simple storage medium for a large number of hand held electronic devices typically cannot be used with PCMCIA card designs.

In addition to these drawbacks, PCMCIA cards have further drawbacks such as the following: cost, a complex interface, a delay in the throughput of data due to reliance on the microcontroller, the need to follow a defined pinout, the need to follow a set voltage level, and the need to adhere to strict dimensional requirements. The regimental design requirements and drawbacks typically do not allow the use of PCMCIA cards for hand held devices with variable dimensions, voltage, and pinout specifications. For example, a PCMCIA memory expansion card that attaches to any lap-top or note-book computer typically cannot be utilized in hand held devices such as digital cameras, audio recorders, and cellular phones.

SUMMARY AND OBJECTS OF THE INVENTION

One objective of the present invention is to provide a method and apparatus to use a volatile or non-volatile memory card in an electronic device.

Another objective of the present invention is to provide a method and apparatus to use a memory card in conjunction with a host operating with a reduced data bus width.

Another objective of the present invention is to provide a memory card that is interchangeable between a personal computer and a hand held electronic device.

An insertable memory card capable of storing various types of memories is described. The insertable memory card having a first set of transmission locations. The first set of transmission locations provide input and output locations for a volatile memory device. The insertable memory card also having a second set of transmission locations. The second set of transmission locations provide input and output locations for a non-volatile memory device.

Other objects, features, and advantages of the present invention will be apparent from the accompanying drawings and from the detailed description which follows below.

BRIEF DESCRIPTION OF THE DRAWINGS

The present invention is illustrated by way of example and not limitation in th efigures of the accompanying drawings, in which like references indicate similar elements, and in which.

DETAILED DESCRIPTION

The present embodiment provides a bus definition for a memory card which allows use of a small form factor memory card in many different markets and applications. In particular, the present embodiment is well suited for hand held consumer products such as hand held personal computers (PCs), digital cameras, audio recorders and smart cellular phones.

The Miniature Card is a type of memory card or memory module. (See Miniature Card Specification, Release 1.0, published Feb. 29, 1996 by Intel Corporation). Currently, the Miniature Card supports a variety of technologies (e.g., Flash, Read-Only-Memory ("ROM"), One-Time Programmable Read-Only Memory ("OTPROM"), Electrically Erasable Programmable Read-Only Memory ("EEPROM"), Dynamic Random Access Memory ("DRAM") and Static Random Access Memory ("SRAM") within a small form factor card. Typically, Flash, ROM, OTPROM, EEPROM are often referred to as non-volatile memories, while DRAM and some SRAM are referred to as volatile memories. Although the Miniature Card specification currently defines the Miniature Card as having the physical dimensions of 38 millimeters (mm)×33 mm×3.5 mm, the Miniature Card specification may be extended to support other technologies and other package sizes. For one embodiment, the present bus definition is incorporated into the bus design of the Miniature Card.

The Miniature Card interface is designed to support two types of memories: standard and DRAM. As such, host sockets can be designed to operate with both types of cards. The standard type of Miniature Cards typically including flash, ROM and EEPROM devices which use the output enable and the write enable signals to respectively read from and write data to the Miniature Card, and the card enable signals to select the low byte or high byte of data for reading and writing data. Although the DRAM Miniature Cards use the same write enable signal for reading and writing, the row address strobe signal is used for selecting the card. The Miniature Card's high performance, small size and simple interface provides an ideal memory solution for hand held devices.

Currently, the Miniature Card is defined as having a sixty connection memory-only bus interface and a three connection power/insertion interface. All the connections provide signals through a set of transmission locations. The location being defined as a pin, an input or output node, a clip, or any interface point for different inputs/outputs of the Minature Card. The sixty interface signals are capable of providing the address bus signals, the data bus signals, and the control signals. The address bus may include twenty-five signals that can address up to 32 Megawords (64 Megabytes) of data. The data bus may include 16 non-multiplexed signals to transfer data to/from the Miniature Card's memory.

More specifically, the interface signals comprise a wide assortment of control signals that define and simplify the communication between the Miniature Card and a host controller coupled to the Miniature Card's interface. These control signals may be used in an active low logic design.

The control signals include the following: (1) the card detect signal (CD), which provides a signal indicating coupling of all interface signals; (2) the output enable signal (OE); (3) the write enable signal (WE), which is used to read and write data; and (4) the chip enable low signal (CEL) and the chip enable high signal (CEH) which are used to enable the Miniature Card. For DRAM devices, however, the row address strobe signal (RAS) and the column address strobe low and high signals (CASL and CASH) are used in place of the CEL and CEH signals.

The interface signals further include two voltage detection signals, the voltage sense 1 signal (VS1) and the voltage sense 2 signal (VS2), which allow the host to determine the power-up voltage for the Miniature Card. The VS1 signal and the VS2 can be sensed by a multiple-voltage hosts to determine the card's power requirements. These signals are similar to those found in PCMCIA cards.

Two serial interface signals, serial data and address signal (SDA) and the serial clock signal (SCL) are provided for interfacing with the EEPROM on DRAM cards. These two signals allow transmission of the DRAM card's identification information (AIS) to the host controller.

The Miniature Card interface also receives or provides, the bus size signal (BS8), the reset signal (RESET) and the busy signal (BUSY). The BS8 signal, driven by the host, indicates if the bus is an 8-bit bus or a 16-bit bus. The RESET signal controls the card initialization. The BUSY signal is generated by the card to indicate the status of operations within the Miniature Card.

The power/insertion signals include the ground signal (GND), the Vcc Power signal (Vcc), and the insertion signal (CINS). The CINS signal provides an early detection mechanism indicating insertion of a Miniature Card into a host controller. Additionally, for a DRAM device, a Vccr signal is typically provided while operating in a low power mode. The Vccr signal supplies a low current (refresh) voltage to keep the DRAM memory refreshed after Vcc has been removed.

Figure 2A:
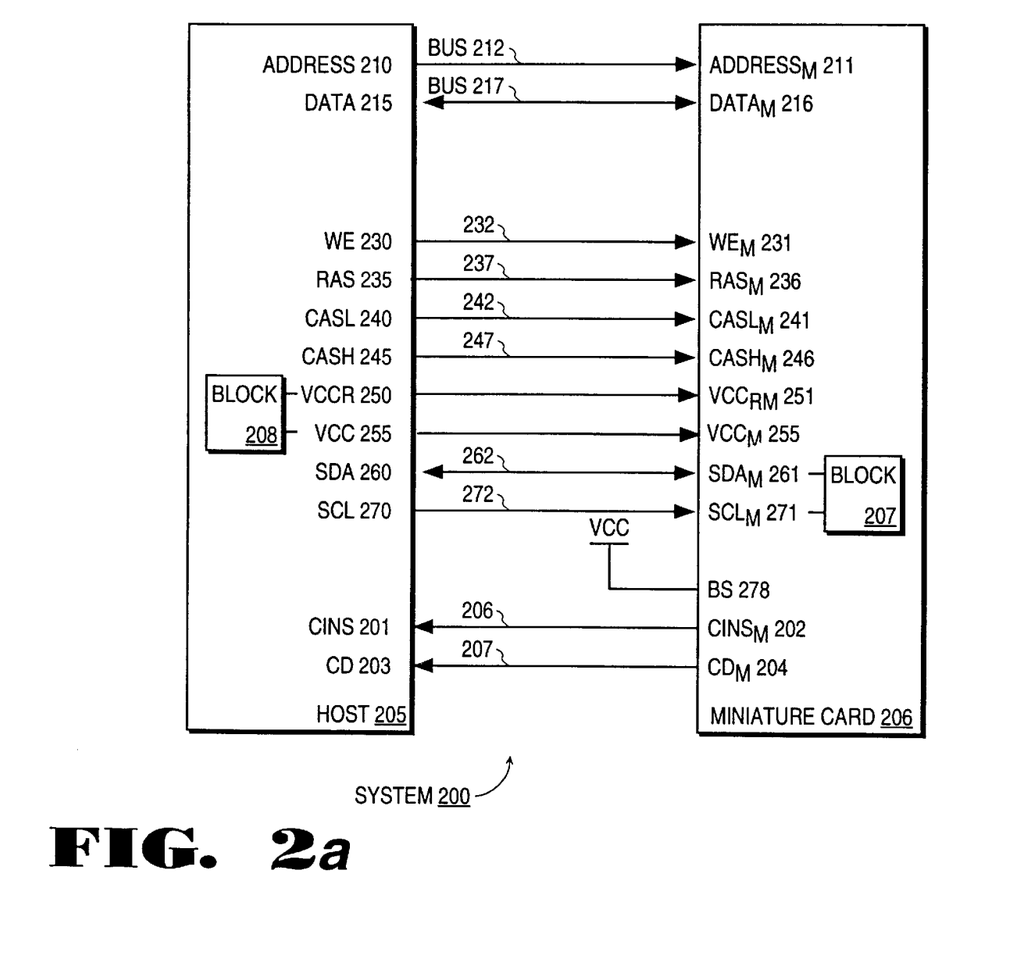
FIG. 2a illustrates one embodiment of the bus interface between a host system and a Miniature Card.

FIG. 2a shows SYSTEM 200, which is illustrative of the coupling between a host controller, HOST 205, and MINIATURE CARD 206 for one embodiment in which MINIATURE CARD 206 is a volatile memory device. The inherent difficulties introduced by inserting a Miniature Card into a system such as a hand held device may be overcome by the interface shown in SYSTEM 200.

During insertion of MINIATURE CARD 206 into SYSTEM 200, HOST 205 is notified of the initial insertion via signal line 206. Complete insertion of MINIATURE CARD 206 is signified via signal line 207. SYSTEM 200 further includes BUS 212 coupled via output ADDRESS 210, of HOST 205, to input $ADDRESS_M$ 211, of MINIATURE CARD 206. Using BUS 212, HOST 205 accesses the memory device within MINIATURE CARD 206.

For one embodiment, MINIATURE CARD 206 is a volatile memory device comprising rows and columns of storage elements. Therefore, HOST 205 may use row address strobe RAS 235, column address strobe low byte CASL 240, and column address strobe high byte CASH 245 to indicate the bits of ADDRESS 210 that correspond to the row and column of the volatile memory device. Subsequent to the selection of the appropriate row and columns of the memory device, BUS 217 is used to transfer data between MINIATURE CARD 206 and HOST 205 via input/output locations $DATA_M$ 216 and DATA 215.

In SYSTEM 200, input location BS 278 of MINIATURE CARD 206 is used by HOST 205 to determine the transmission format. BS 278 is functionally equivalent to signal BS8 as defined in the Miniature Card specification. As illustrated in FIG. 2a, BS 278 is directly coupled to power supply VCC, thus indicating to MINIATURE CARD 206 that HOST 205 uses the maximum bus width of MINIATURE CARD 206. Accordingly, each location in $DATA_M$ 216 has a corresponding location in DATA 215 and direct transmission of data is possible. For an alternative embodiment, input location BS 278 is coupled to ground to operate in a duplex bus design. The duplex bus design is discussed below in conjunction with FIG. 3.

Additionally, HOST 205 includes output WE 230. The WE 230 notifies MINIATURE CARD 206 to read or write data on BUS 217. Thus, once the data transmission format is determined by BS 278, signal WE 230 is used to control data transmission between HOST 205 and MINIATURE CARD 206. For an alternative embodiment, a shared synchronized clock signal may also be used to control data transmission between HOST 205 and MINIATURE CARD 206. Furthermore, in another embodiment, input location BS 278 may be directly controlled via HOST 205.

Typically, during inactive periods SYSTEM 200 turns off the system power supply to maintain battery life. The volatile memory element within MINIATURE CARD 206 requires that SYSTEM 200 maintain power to MINIATURE CARD 206 during this inactive period in order to refresh its memory. Accordingly, BLOCK 208, signal VCC 255, and signal VCCR 250 allow SYSTEM 200 to support volatile memory device MINIATURE CARD 206 during power down.

VCC 255 provides a voltage supply during normal operation of SYSTEM 200. For an embodiment in which MINIATURE CARD 206 is a DRAM device, during power savings mode SYSTEM 200 turns off the internal power supply of HOST 205, effectively disconnecting output location VCC 255 from MINIATURE CARD 206's input $VCC_M$ 255. During this period BLOCK 208 couples alternate power supply VCCR 250 to supply location $VCC_{RM}$ 251 of MINIATURE CARD 206, ensuring that the dynamic cells of MINIATURE CARD 206 are consistently supplied with power. When SYSTEM 200 returns to normal operation and supplies power through VCC 255, BLOCK 208 disconnects the alternate power supply VCCR 250 and connects VCC 255 to the $VCC_M$ 255 input of MINIATURE CARD 206. Thus, BLOCK 208 permits a bus definition allowing two separate power supply lines for MINIATURE CARD 206.

Additionally, SYSTEM 200 includes a bus definition for transmitting configuration data between MINIATURE CARD 206 and HOST 205. The configuration data includes identification, compatibility, and burst information data used by HOST 205 to set up a transmission protocol between HOST 205 and MINIATURE CARD 206. The volatile memory device within MINIATURE CARD 206 does not have the capability to maintain its configuration data when inactive (i.e., powered down); accordingly BLOCK 207 and input/output locations SDA 260, SDAM 261, SCL 270, and SCLM 271 are used to allow the use of a volatile memory device in SYSTEM 200.

Therefore, when MINIATURE CARD 206 is a volatile memory device Block 207, located within MINIATURE CARD 206, stores the configuration data. Signal line 272 transmits a clock signal between locations SCL 270 and $SCL_M$ 271 allowing synchronous communication between HOST 205 and BLOCK 207 along signal line 262. Thus, using output location $SDA_M$ 261, BLOCK 207 serially transfers MINIATURE CARD 206's configuration data to HOST 205's input location SDA 260. With the transmitted configuration data HOST 205 determines the appropriate parameters for data transfer along data bus 217.

SYSTEM 200 comprises a MINIATURE CARD 206 design that uses a volatile memory device operable in a wide range of supply voltages with a variable bus width between the MINIATURE CARD 206 and HOST 205. Furthermore, BLOCK 207 may store configuration data for multiple memory devices, thus allowing MINIATURE CARD 206 to include multiple memory devices on a single memory card.

Figure 2B:
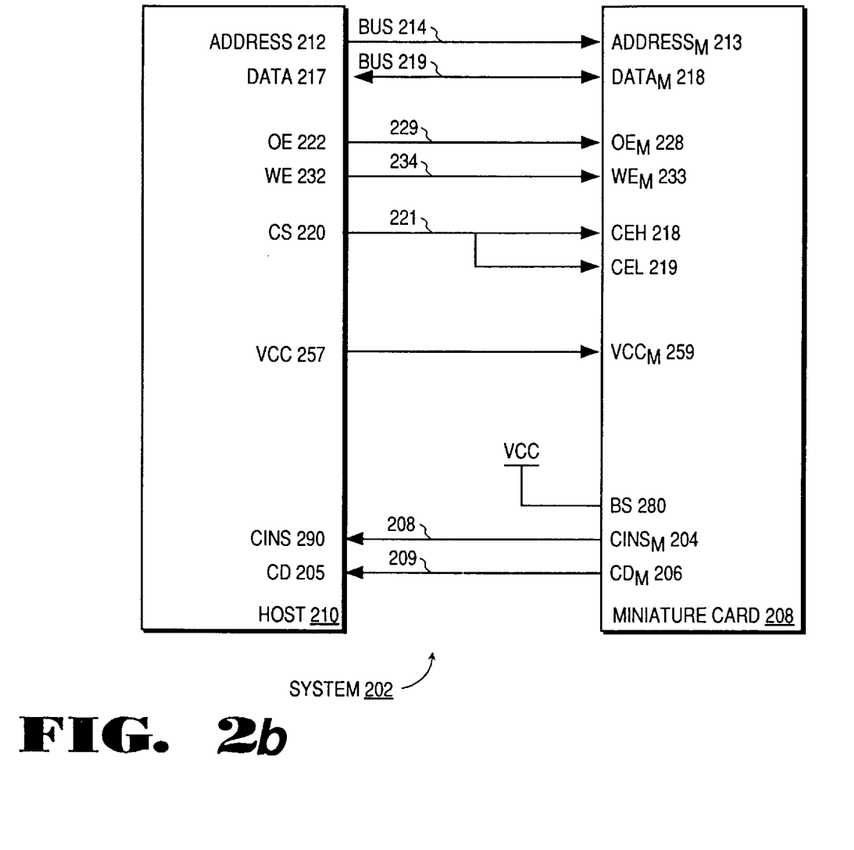
FIG. 2b illustrates an alternative embodiment of the bus interface between a host system and a Miniature Card.

FIG. 2b shows HOST 210 coupled to MINIATURE CARD 202 in SYSTEM 202. MINIATURE CARD 208 is a non-volatile memory device. The inherent difficulties introduced by inserting a Miniature Card 208 into a system such as a hand held device may be overcome by the interface shown in SYSTEM 202.

During insertion of MINIATURE CARD 208 into SYSTEM 202, HOST 210 is notified of the initial insertion via signal line 208. Complete insertion of MINIATURE CARD 208 is signified via signal line 209. SYSTEM 202 further includes BUS 214 coupled via output ADDRESS 212, of HOST 210, to input $ADDRESS_M$ 213, of MINIATURE CARD 208. Using BUS 214, HOST 210 accesses the memory device within MINIATURE CARD 208. Subsequent to the selection of the appropriate address of the memory device, BUS 219 is used to transfer data between MINIATURE CARD 208 and HOST 210 via input/output locations $DATA_M$ 218 and DATA 217.

VCC 257 provides a voltage supply during normal operation of SYSTEM 202. Typically, during inactive periods SYSTEM 202 turns off the system power supply to maintain battery life, effectively disconnecting output location VCC 257. SYSTEM 202 may turn off system power without concern for loss of stored data because MINIATURE CARD 208 is a nonvolatile memory device (i.e., ROM). Accordingly, power transfer is implemented through a simple connection between VCC 257 and $VCC_M$ 259.

In SYSTEM 202, input location BS 280 of MINIATURE CARD 208 is used by HOST 210 to determine the transmission format. BS 280 is functionally equivalent to signal BS8 as defined in the Miniature Card Specification. As illustrated in FIG. 2b, BS 280 is directly coupled to power supply VCC, thus indicating to MINIATURE CARD 208 that HOST 210 utilizes the maximum bus width of MINIATURE CARD 208. Accordingly, each location in $DATA_M$ 218 has a corresponding location in DATA 217 and direct transmission of data is possible. Further, the direct transmission of data, allows SYSTEM 202 to simply couple the chip select signal CS 220 to the chip enable signals CEH 218 and CEL 219 without any extraneous circuitry. For an alternative embodiment, input location BS 278 is coupled to ground to operate in a duplex bus design. The duplex bus design is discussed below in conjunction with FIG. 3.

Additionally, HOST 210 includes outputs OE 222 and WE 232. The OE 222 is asserted low or high, dependent on whether OE 222 is an active low or high logic level signal, to tri-state MINIATURE CARD 208's outputs. The WE 232 notifies MINIATURE CARD 208 to read or write data on BUS 219 dependent on the assertion of OE 222. Thus, once the data transmission format is determined by BS 280, signals OE 222 and WE 232 are used to control data transmission between HOST 210 and MINIATURE CARD 208.

For one embodiment, a high assertion of the OE 222 signal tri-states MINIATURE CARD 208's outputs. Additionally, a high assertion of the WE 232 input in conjunction with a low OE 222 input indicates a read operation for MINIATURE CARD 208, while a low to high transition of the WE 232 input in conjunction with a high OE 222 input indicates a write operation. For an alternative embodiment a shared synchronized clock signal may also be used to control data transmission between HOST 210 and MINIATURE CARD 208. Furthermore, input location BS 280 may be directly controlled via HOST 210.

Additionally, SYSTEM 202 includes a bus definition for transmitting configuration data between MINIATURE CARD 208 and HOST 210. The configuration data includes identification, compatibility, and burst information data used by HOST 210 to set up a transmission protocol between HOST 210 and MINIATURE CARD 208. In SYSTEM 202 the configuration data is permanently stored in MINIATURE CARD 208's memory element and is accessed through $ADDRESS_M$ 213 and $DATA_M$ 218.

SYSTEM 202 comprises a MINIATURE CARD 208 design that uses a volatile memory device operable in a wide range of supply voltages with a variable bus width between the MINIATURE CARD 208 and HOST 210.

Figure 3:
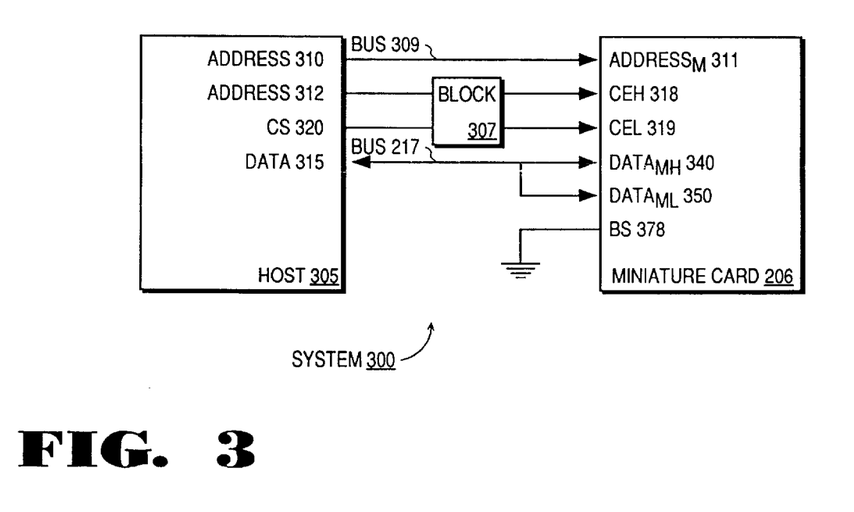
FIG. 3 illustrates one embodiment of the bus interface between a Miniature Card and a host having a reduced data bus width.

FIG. 3 shows a SYSTEM 300 with a variable bus width. The MINIATURE CARD 306 has a sixteen bit data output $DATA_{ML}$ 350 and $DATA_{MH}$ 340 coupled to the eight bit output DATA 315 of HOST 305 along a shared BUS 217. The sharing of a bus is referred to as a duplex bus design. To operate in the duplex mode, signal BS 378 is biased to ground. The duplex bus design may be implemented in other systems having a host that has a bus width that is half the size of memory card's bus width. In the duplex bus design of SYSTEM 300, bit 0 is coupled externally to bit 8, bit 1 to bit 9, . . . , and bit 7 to bit 15. Accordingly, the sixteen bit MINIATURE CARD 306 may communicate with the eight bit device HOST 305 provided inputs CEL 319 and CEH 318 of the MINIATURE CARD are asserted independently and at different times. For one embodiment, BLOCK 307 provides the signals to inputs CEL 319 and CEH 318. For an alternative embodiment, a host may provide the signals to inputs CEL 319 and CEH 318.

BLOCK 307 is coupled to utilize card enable low byte, CEL 319, and card enable high byte, CEH 318, of MINIATURE CARD 306. Coupling BLOCK 307 to CEL 319 and CEH 318 ensures that MINIATURE CARD 306 outputs either the lower or upper half of the data on BUS 217, thus removing bus contention. BLOCK 307 is also coupled to HOST 305's output signals ADDRESS 312 and CS 320. Using ADDRESS 312 and CS 320, HOST 305 is able to determine whether the lower or upper half of a memory address selected by ADDRESS 310 is exchanged on BUS 217. For an embodiment, the address signal provided by ADDRESS 312 is the lowest order address bit. Performing multiple read or writes from MINIATURE CARD 206, HOST 305 is able to exchange data in a duplex fashion with MINIATURE CARD 306.

Figure 4:
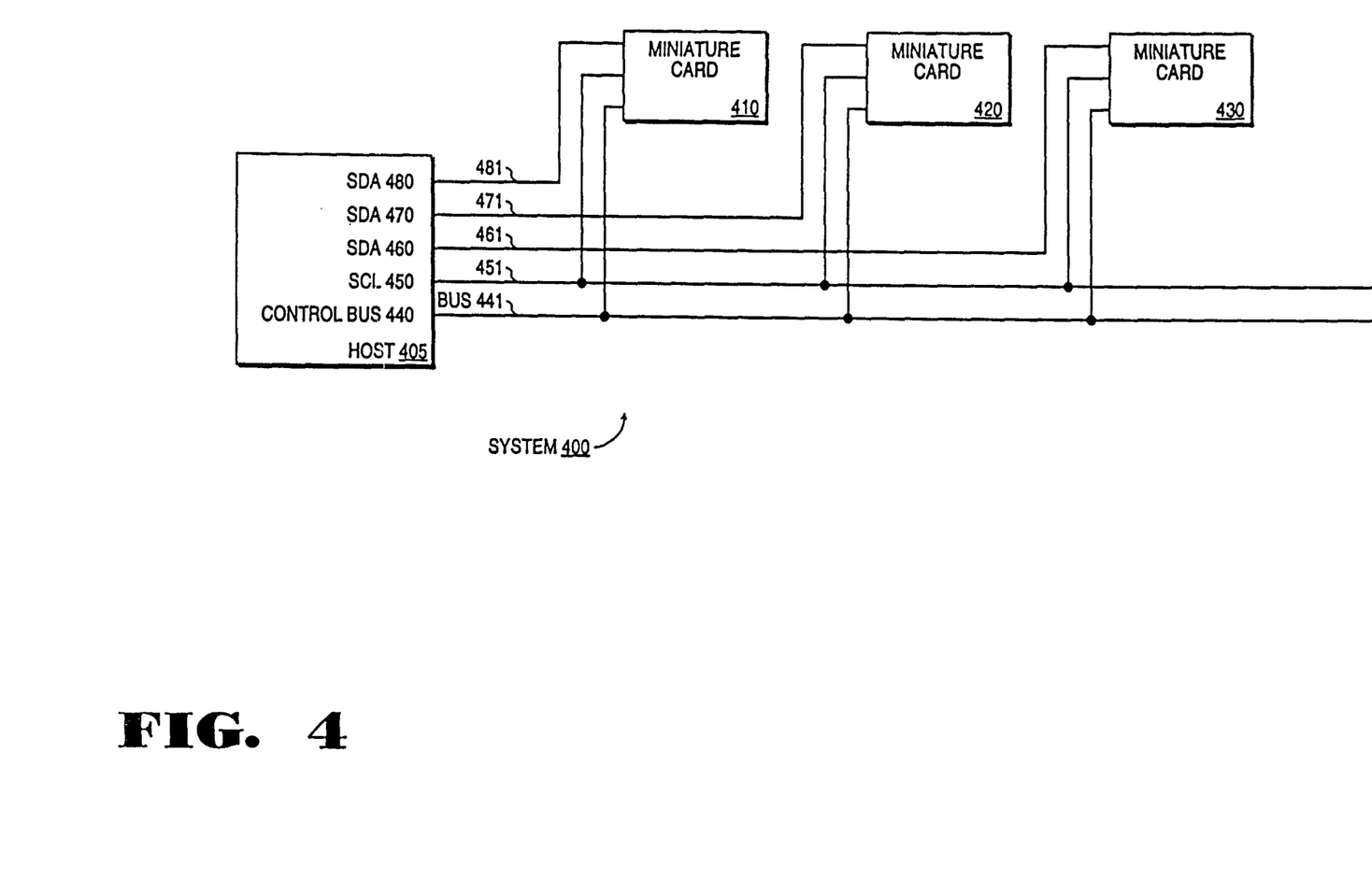
FIG. 4 illustrates one embodiment of the bus interface between a host and multiple Miniature Card.

FIG. 4 illustrates a design for coupling multiple volatile memory cards to a single host. SYSTEM 400 includes HOST 405 coupled to MINIATURE CARD 410, 420, and 430. HOST 405 follows the bus definition of SYSTEM 200 and further includes inputs SDA 460, 470, and 480 coupled to signal lines 461, 471, and 481 respectively. The SDA 460, 470, and 480 inputs are utilized by HOST 405 to receive configuration data from MINIATURE CARD 410, 420, and 430.

HOST 405 transmits a clock signal from output SCL 450 to MINIATURE CARDS 410, 420, and 430 along line 451. This clock signal allows MINIATURE CARDS 410, 420, and 430 to synchronously transmit configuration data to HOST 405 along lines 481, 471, and 461. The configuration data informs HOST 405 of the appropriate transmission protocol for communicating with each Miniature Card. SYSTEM 400 utilizes the configuration data of each Miniature Card to determine the correct format for exchanging data between the multiple Miniature Cards and HOST 405 along BUS 441. Accordingly, SYSTEM 400 is able to realize a host controller coupled to multiple Miniature Cards.

The foregoing specification has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. An insertable memory card capable of having various types of memory devices, comprising:
   a first set of control signal transmission locations for a dynamic random access memory (DRAM) device;
   a second set of control signal transmission locations for a non-volatile memory device;
   a dynamic random access memory (DRAM) device coupled to the first set of transmission locations;
   a non-volatile memory device coupled to the second set of transmission locatioins and storing identification data for the insertable memory card;
   a clock input to receive a clock input signal; and
   an outptut to serially output the identification data synchronously with respect to the clock signal received by the clock input.

2. The insertable memory card of claim 1, further comprising a first output, the first output providing a signal indicating that a front end of the memory card has been inserted into a host.

3. The insertable memory card of claim 1, further comprising a an input configured to receive a signal indicating duplex or normal data transfer along a data bus.

4. The insertable memory card of claim 1, further comprising an output for indicating complete coupling of the insertable memory card into a host.

5. The insertable memory card of claim 1, wherein the insertable memory card comprises multiple memory devices.

6. The insertable memory card of claim 1, wherein the insertable memory card comprises a Miniature Card.

7. The insertable memory card of claim 1, wherein the insertable memory card is interchangeable between systems.

8. The insertable memory card of claim 1, wherein the first set of transmision local comprise:
   a first transmission location for providing a primary supply voltage to the DRAM device; and
   a second transmission location for providing a secondary supply voltage to the DRAM device during a low power mode of operation of the insertable memory card, the secondary supply voltage provided when the first transmission location does not receive the primary supply voltage, the secondary supply voltage to maintain power to the DRAM device to keep the DRAM device refreshed during the low power mode.

9. A method for electronic communication between an insertable memory card and a host controller, the insertable memory card having a non-volatile memory device and a dynamic random acess memory (DRAM) device the method comprising:

transmitting DRAM control signals between the host controller and the DRAM device over a first set of transmission lines;

transmitting a clock signal between the host controller and the insertable memory card; and serially transmitting identification data for the insertable memory card over a second transmission location from the non-volatile memory device to the controller synchronousl with repect to the clock signal.

10. The method of claim 9, further comprising the step of transmitting a first signal from the insertable memory card to the host controller, the first signal notifies the host controller that a front end of the memory card has been inserted.

11. The method of claim 10, further comprising the step of transmitting a second signal subsequent to the first signal indicating complete coupling of the memory card to the plurality of transmission lines.

12. The method of claim 9, wherein a first control signal determines a duplex format and a third set of transmission lines transmits data in a duplex format.

13. An apparatus which includes a socket for accepting a memory card, the apparatus comprising:

a plurality of parallel interface data transmission locations for communicating data with the memory card;

a first input to serially receive a signal indicating a type of memory device utilized by the memory card;

a first clock output to provide a synchronizing clock signal for transmission of the signal along the first input; and a plurality of control transmission locations to communicate control signals between the memory card and the apparatus.

14. The apparatus of claim 13 further comprising a second input, the second input to receive a signal indicating insertion of the memory card in the socket.

15. The apparatus of claim 13 further comprising a second output, the second output to provide a signal indicating duplex or normal data transfer over the data transmission locations of the apparatus.

16. The apparatus of claim 13 further comprising:

a first circuit, the first circuit to regulate power supply between a first power output and a second power output of the apparatus wherein the first circuit disconnects the first power oultput and conniects the second power output during inactive periods of the apparatus, the second power output providing a sustaining current to the memory card during inactive periods of the apparatus.

17. The apparatus of claim 16, wherein the first circuit disconnects the second power output and connects the first power output during active periods of the apparatus.

18. The apparatus of claim 13, including n sockets for accepting n memory cards and n inputs, wherein n>1, each one of the n inputs receiving identification data from one of the n memory cards.

19. The apparatus of claim 13, wherein the socket for accepting a memory card permits insertion of a small form factor memory card of approximately 33 millimeters by 38 millimeters by 3.5 millimeters.

20. The apparatus of claim 13, wherein the memory card comprises multiple memory devices.

21. An insertable memory card for communicating with a host device, the memory card comprising:

a plurality of parallel interface data transmission locations for providing data to the host device;

a volatile memory device coupled to the data transmission locations;

a plurality of volatile memory transmission locations configured to provide volatile control signals to the volatile memory device;

a non-volatile memory device coupled to the data transmission locations and having identification data for the memory card;

a plurality of non-volatile memory transmission locations configured to provide non-volatile control signals to the non-volatile memory device and including:

a first transmission location configured to receive a clock signal; and a second transmission location configured to serially output the identification data from the non-volatile memory device synchronously with respect to the clock signal.

22. A system comprising:

a control bus;

a plurality of parallel interface data signal lines;

a host device coupled to the control bus and having an output and a first input, the output configured to output a clock signal;

a first memory card having:

a first volatile memory device configured to communicate with the host device over the plurality of data signal lines;

a first non-volatile memory device having first identification data for the first memory card;

a first input configured to receive the clock signal; and a first output configured to serially output the first identification data from the non-volatile memory device to the first input of the host device, the first output configured to output the first identification data synchronously with respect to the clock signal.

23. The system of claim 22, wherein the host device further includes a second input, and wherein the system further comprises a second memory card having:

a second volatile memory device configured to communicate with the host device via the control bus and the plurality of data signal lines;

a second non-volatile memory device having second identification data for the second memory card;

a second input configured to receive the clock signal; and a second output configured to serially output the second identification data from the non-volatile memory device to the second input of the host device, the second output configured to output the second identification data synchronously with respect to the clock signal.

* * * * *

UNITED STATES PATENT AND TRADEMARK OFFICE
CERTIFICATE OF CORRECTION

PATENT NO. : 5,938,750
DATED : August 17, 1999
INVENTOR(S) : Shaberman

It is certified that error appears in the above-identified patent and that said Letters Patent is hereby corrected as shown below:

Column 2,
Line 62, delete "th efigures" and insert -- the figures --.

Column 3,
Line 7, delete "Card" and insert -- Cards --.

Column 8,
Line 27, delete "locatioins" and insert -- locations --.
Line 31, delete "outptut" and insert -- output --.
Line 52, delete "transmision local" and insert -- transmission locations --.
Line 67, delete "acess" and insert -- access --.

Column 9,
Line 8, delete "synchronous1" and insert -- synchronously --.
Line 9, delete "repect" and insert -- respect --.
Line 45, delete "oultput" and insert -- output --.
Line 45, delete "conniects" and insert -- connects --.

Signed and Sealed this

Eighteenth Day of March, 2003

JAMES E. ROGAN
*Director of the United States Patent and Trademark Office*